(12) United States Patent
Naserian et al.

(10) Patent No.: US 12,051,324 B2
(45) Date of Patent: Jul. 30, 2024

(54) COLLABORATIVE ILLUMINATION (71) Applicant: GM Global Technology Operations LLC, Detroit, MI (US)

(72) Inventors: Mohammad Naserian, Windsor (CA); Bryan Quintanilla, Detroit, MI (US); Donald K Grimm, Utica, MI (US); Paul E Krajewski, Troy, MI (US); Fan Bai, Ann Arbor, MI (US); Craig A Kollar, Sterling Heights, MI (US); Abby Szafranski, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 340 days.

(21) Appl. No.: 17/387,079

(22) Filed: Jul. 28, 2021

(65) Prior Publication Data
US 2023/0034777 A1 Feb. 2, 2023

(51) Int. Cl.
*G08G 1/01* (2006.01)
*F21S 41/00* (2018.01)
*G01C 21/32* (2006.01)
*G08G 1/04* (2006.01)
*H04W 4/46* (2018.01)

(52) U.S. Cl.
CPC ............ *G08G 1/0112* (2013.01); *F21S 41/00* (2018.01); *G01C 21/32* (2013.01); *G08G 1/04* (2013.01); *H04W 4/46* (2018.02)

(58) Field of Classification Search
CPC ........ G08G 1/0112; G08G 1/04; G08G 1/163; G08G 1/166; G08G 1/167; G01C 21/32; G01C 21/3815; F21S 41/00; H04W 4/46; H04W 4/38; H04W 4/40; H04W 4/90; B60Q 1/085; B60Q 2300/45; B60Q 2300/47; B60Q 1/143
See application file for complete search history.

(56) References Cited

U.S. PATENT DOCUMENTS

| | | | | |
|---|---|---|---|---|
| 11,335,194 | B1 * | 5/2022 | Yasuda | B60Q 1/48 |
| 2019/0176684 | A1 * | 6/2019 | Zych | G06V 20/58 |
| 2019/0311206 | A1 * | 10/2019 | Solar | B60Q 1/085 |
| 2021/0157006 | A1 * | 5/2021 | Sun | G06V 20/56 |
| 2021/0213873 | A1 * | 7/2021 | Martin | B60Q 1/085 |
| 2021/0380137 | A1 * | 12/2021 | Domeyer | B60W 10/22 |

* cited by examiner

Primary Examiner — Tyler J Lee
Assistant Examiner — Kimia Kohankhaki
(74) Attorney, Agent, or Firm — CANTOR COLBURN LLP (57) ABSTRACT

Examples described herein provide a computer-implemented method that includes includes receiving, by a processing device of a vehicle, first road data. The method further includes receiving, by the processing device of the vehicle, second road data from a sensor associated with the vehicle. The method further includes identifying, by the processing device of the vehicle, an object based at least in part on the first road data and the second road data. The method further includes causing, by the processing device of the vehicle, the object to be illuminated.

20 Claims, 7 Drawing Sheets

COLLABORATIVE ILLUMINATION

INTRODUCTION

The present disclosure relates to vehicles and more particularly to collaborative illumination.

Modern vehicles (e.g., a car, a motorcycle, a boat, or any other type of automobile) may be equipped with a vehicular communication system that facilitates different types of communication between the vehicle and other entities. For example, a vehicular communication system can provide for vehicle-to-infrastructure (V2I), vehicle-to-vehicle (V2V), vehicle-to-pedestrian (V2P), and/or vehicle-to-grid (V2G) communication. Collectively, these may be referred to as vehicle-to-everything (V2X) communication that enables communication of information from the vehicle to any other suitable entity. Various applications (e.g., V2X applications) can use V2X communications to send and/or receive safety messages, maintenance messages, vehicle status messages, and the like.

Modern vehicles can also include one or more cameras that provide back-up assistance, take images of the vehicle driver to determine driver drowsiness or attentiveness, provide images of the road as the vehicle is traveling for collision avoidance purposes, provide structure recognition, such as roadway signs, etc. For example, a vehicle can be equipped with multiple cameras, and images from multiple cameras (referred to as "surround view cameras") can be used to create a "surround" or "bird's eye" view of the vehicle. Some of the cameras (referred to as "long-range cameras") can be used to capture long-range images (e.g., for object detection for collision avoidance, structure recognition, etc.).

Such vehicles can also be equipped with sensors such as a radar device(s), LiDAR device(s), and/or the like for performing target tracking. Target tracking includes identifying a target object and tracking the target object over time as the target object moves with respect to the vehicle observing the target object. Images from the one or more cameras of the vehicle can also be used for performing target tracking.

SUMMARY

In one exemplary embodiment, a computer-implemented method for collaborative illumination is provided. The method includes receiving, by a processing device of a vehicle, first road data. The method further includes receiving, by the processing device of the vehicle, second road data from a sensor associated with the vehicle. The method further includes identifying, by the processing device of the vehicle, an object based at least in part on the first road data and the second road data. The method further includes causing, by the processing device of the vehicle, the object to be illuminated.

In addition to one or more of the features described herein, or as an alternative, further embodiments of the method may include that the object is selected from a group consisting of a vulnerable road user and a road hazard.

In addition to one or more of the features described herein, or as an alternative, further embodiments of the method may include that the first road data is received from a device selected from a group consisting of an edge computing node and a cloud computing node of a cloud computing environment.

In addition to one or more of the features described herein, or as an alternative, further embodiments of the method may include that the vehicle is a first vehicle, and wherein the first road data is received from a second vehicle.

In addition to one or more of the features described herein, or as an alternative, further embodiments of the method may include that the first road data is received from the second vehicle via a direct vehicle-to-vehicle communication protocol between the first vehicle and the second vehicle.

In addition to one or more of the features described herein, or as an alternative, further embodiments of the method may include that the first road data comprises local data and global data.

In addition to one or more of the features described herein, or as an alternative, further embodiments of the method may include that the sensor is selected from the group consisting of a camera, a LiDAR device, and a radar device.

In addition to one or more of the features described herein, or as an alternative, further embodiments of the method may include that identifying the object comprises fusing, by the processing device of the vehicle, the first road data and the second road data.

In addition to one or more of the features described herein, or as an alternative, further embodiments of the method may include that causing the object to be illuminated includes illuminating the object using a light assembly of the vehicle.

In addition to one or more of the features described herein, or as an alternative, further embodiments of the method may include that the illuminating comprises increasing a brightness of a light emitted by the light assembly of the vehicle.

In addition to one or more of the features described herein, or as an alternative, further embodiments of the method may include that the illuminating comprises decreasing a brightness of a light emitted by the light assembly of the vehicle.

In addition to one or more of the features described herein, or as an alternative, further embodiments of the method may include that causing the object to be illuminated includes illuminating the object using a light assembly of another vehicle.

In addition to one or more of the features described herein, or as an alternative, further embodiments of the method may include that the vehicle is a first vehicle, and that causing the object to be illuminated includes illuminating the object using a light assembly of a second vehicle.

In addition to one or more of the features described herein, or as an alternative, further embodiments of the method may include that the second vehicle is a parked vehicle.

In addition to one or more of the features described herein, or as an alternative, further embodiments of the method may include that identifying the object is further based at least in part on a gaze of an operator of the vehicle.

In addition to one or more of the features described herein, or as an alternative, further embodiments of the method may include that identifying the object includes generating an object map; generating, on the object map, a bounding box around the object; and determining a centroid of the bounding box.

In addition to one or more of the features described herein, or as an alternative, further embodiments of the method may include that the object is a first object, that the bounding box is a first bounding box, and that the centroid is a first centroid, the method further including identifying a second object. The method further includes generating, on the object map, a second bounding box around the second object. The method further includes determining a second centroid of the second bounding box. The method further includes generating, on the object map, a group bounding box around the first object and the second object. The method further includes determining a group centroid of the group bounding box.

In addition to one or more of the features described herein, or as an alternative, further embodiments of the method may include that the group centroid is biased based at least in part on a type of the first object and a type of the second object.

In another exemplary embodiment, a system is provided. The system includes a memory having computer readable instructions. The system further includes a processing device for executing the computer readable instructions, the computer readable instructions controlling the processing device to perform operations for collaborative illumination. The operations include receiving, by the processing device of a vehicle, first road data. The method further includes receiving, by the processing device of the vehicle, second road data from a sensor associated with the vehicle. The method further includes identifying, by the processing device of the vehicle, an object based at least in part on the first road data and the second road data. The method further includes causing, by the processing device of the vehicle, the at least one of the object to be illuminated.

In yet another exemplary embodiment, a computer program product is provided. The computer program product includes a computer readable storage medium having program instructions embodied therewith, wherein the computer readable storage medium is not a transitory signal per se, the program instructions executable by a processing device to cause the processing device to perform operations for collaborative illumination. The operations include receiving, by the processing device of a vehicle, first road data. The method further includes receiving, by the processing device of the vehicle, second road data from a sensor associated with the vehicle. The method further includes identifying, by the processing device of the vehicle, an object based at least in part on the first road data and the second road data. The method further includes causing, by the processing device of the vehicle, the at least one of the object to be illuminated.

The above features and advantages, and other features and advantages, of the disclosure are readily apparent from the following detailed description when taken in connection with the accompanying drawings.

BRIEF DESCRIPTION OF THE DRAWINGS

Other features, advantages, and details appear, by way of example only, in the following detailed description, the detailed description referring to the drawings in which.

DETAILED DESCRIPTION

The following description is merely exemplary in nature and is not intended to limit the present disclosure, its application or uses. It should be understood that throughout the drawings, corresponding reference numerals indicate like or corresponding parts and features. As used herein, the term module refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The technical solutions described herein provide for collaborative illumination. When a vehicle traverses a roadway, road hazards (e.g., potholes, oil on the roadway, obstacle on or near the roadway, fog, flooding, etc.) can be harmful to the vehicle. Vulnerable road users (VRUs), such as pedestrians, can be harmed by the vehicle, such as if the vehicle strikes the VRU. In both cases, it may be desirable to improve illumination of road hazards and/or VRUs. To do this, the present techniques use data from the vehicle and data from other sources (e.g., other vehicles, Internet-of-Things (IoT) devices, etc.) can be used to collaboratively illuminate an area, a road hazard, a VRU, and the like to illuminate a scene.

Conventional adaptive forward lighting systems for vehicles only consider the host vehicle's trajectory and forward geometry from sensing or a map to generate lighting patterns. One or more embodiments described herein utilize connected vehicle telemetry data and perception data from multiple vehicles and/or other devices to collaboratively illuminate a scene. For example, one or more embodiments use collaboration between multiple roadway perception entities (e.g., vehicles, IoT devices, etc.) to illuminate VRUs and/or road hazards.

Figure 1:
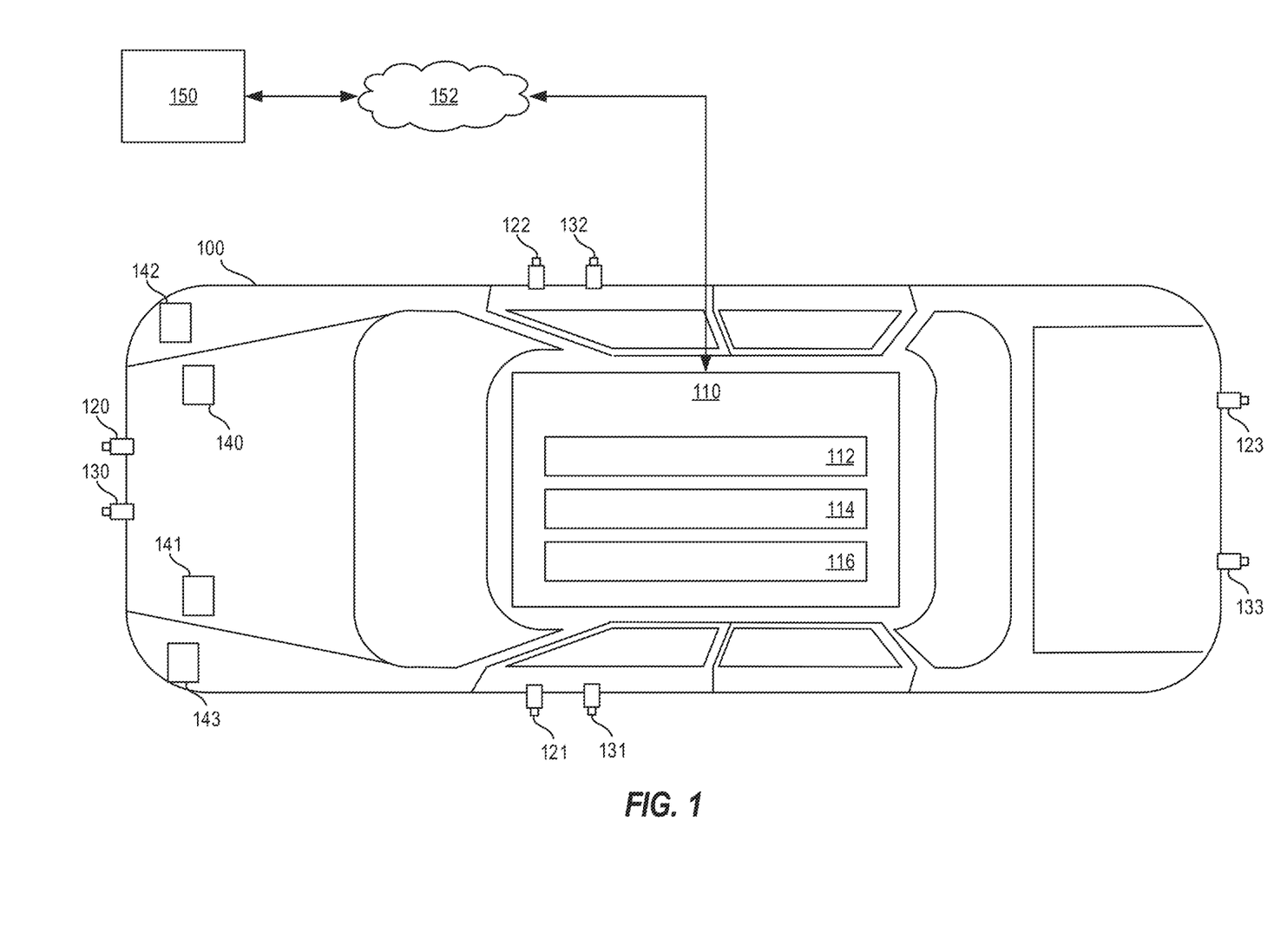
FIG. 1 depicts a vehicle including sensors and a processing system for collaborative illumination according to one or more embodiments described herein.

FIG. 1 depicts a vehicle 100 including sensors and a processing system 110 for collaborative illumination according to one or more embodiments described herein. In the example of FIG. 1, the vehicle 100 includes the processing system 110, cameras 120, 121, 122, 123, cameras 130, 131, 132, 133, a radar sensor 140, and a LiDAR sensor 141. The vehicle 100 may be a car, truck, van, bus, motorcycle, boat, plane, or another suitable vehicle 100.

The cameras 120-123 are surround view cameras that capture images external to, and in near proximity to, the vehicle 100. The images captured by the cameras 120-123 together form a surround view (sometimes referred to as a "top-down view" or a "bird's eye view") of the vehicle 100. These images can be useful for operating the vehicle (e.g., parking, backing, etc.). The cameras 130-133 are long-range cameras that capture images external to the vehicle and farther away from the vehicle 100 than the cameras 120-123. These images can be useful for object detection and avoidance, for example. It should be appreciated that, although eight cameras 120-123 and 130-133 are shown, more or fewer cameras may be implemented in various embodiments.

Captured images can be displayed on a display (not shown) to provide external views of the vehicle 100 to the driver/operator of the vehicle 100. The captured images can be displayed as live images, still images, or some combination thereof. In some examples, the images can be combined to form a composite view, such as the surround view.

The radar sensor 140 measures range to a target object by transmitting electromagnetic waves and measuring the reflected waves with a sensor. This information is useful for determining a target object's distance/location relative to the vehicle 100.

The LiDAR (light detection and ranging) sensor 141 measures distance to a target object by illuminating the target with pulsed laser light and measuring the reflected pulses with a sensor. This information is useful for determining a target object's distance/location relative to the vehicle 100.

The vehicle 100 can also include light assemblies 142, 143 to emit light. As an example, one or more of the light assemblies 142, 143 can include one or more of a parking light, a headlight, etc. The type and number of light assemblies can vary and are not limited to the number and position as shown in FIG. 1.

Data generated from the cameras 120-123, 130-133, the radar sensor 140, and/or the LiDAR sensor 141 can be used to track a target object relative to the vehicle 100. Examples of target objects include other vehicles, vulnerable road users (VRUs) such as pedestrians, bicycles, animals, potholes, oil on a roadway surface, debris on a roadway surface, fog, flooding, and the like.

The processing system 110 includes a data/communication engine 112, an identification engine 114, and an illumination engine 116. Although not shown, the processing system 110 can include other components, engines, modules, etc., such as a processor (e.g., a central processing unit, a graphics processing unit, a microprocessor, etc.), a memory (e.g., a random-access memory, a read-only memory, etc.), data store (e.g., a solid state drive, a hard disk drive, etc.) and the like.

The processing system 110 can be communicatively coupled to a remote processing system 150, which can be an edge processing node as part of an edge processing environment (see, e.g., FIG. 3), a cloud processing node as part of a cloud processing environment (see, e.g. FIG. 3), or the like. For example, the processing system 110 can include a network adapter (not shown) (see, e.g., the network adapter 726 of FIG. 7). The network adapter enables the processing system 110 to transmit data to and/or receive data from other sources, such as other processing systems, data repositories, and the like including the remote processing system 150. As an example, the processing system 110 can transmit data to and/or receive data from the remote processing system 150 directly and/or via a network 152.

The network 152 represents any one or a combination of different types of suitable communications networks such as, for example, cable networks, public networks (e.g., the Internet), private networks, wireless networks, cellular networks, or any other suitable private and/or public networks. Further, the network 152 can have any suitable communication range associated therewith and may include, for example, global networks (e.g., the Internet), metropolitan area networks (MANs), wide area networks (WANs), local area networks (LANs), or personal area networks (PANs). In addition, the network 152 can include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof. According to one or more embodiments described herein, the remote processing system 150 and the processing system 110 communicate via a vehicle-to-infrastructure (V2I), vehicle-to-vehicle (V2V), vehicle-to-pedestrian (V2P), and/or vehicle-to-grid (V2G) communication.

The features and functionality of the components of the processing system 110 are described further herein. The processing system 110 of the vehicle 100 aids in collaborative illumination. This process is described further with reference to the remaining figures.

Figure 2:
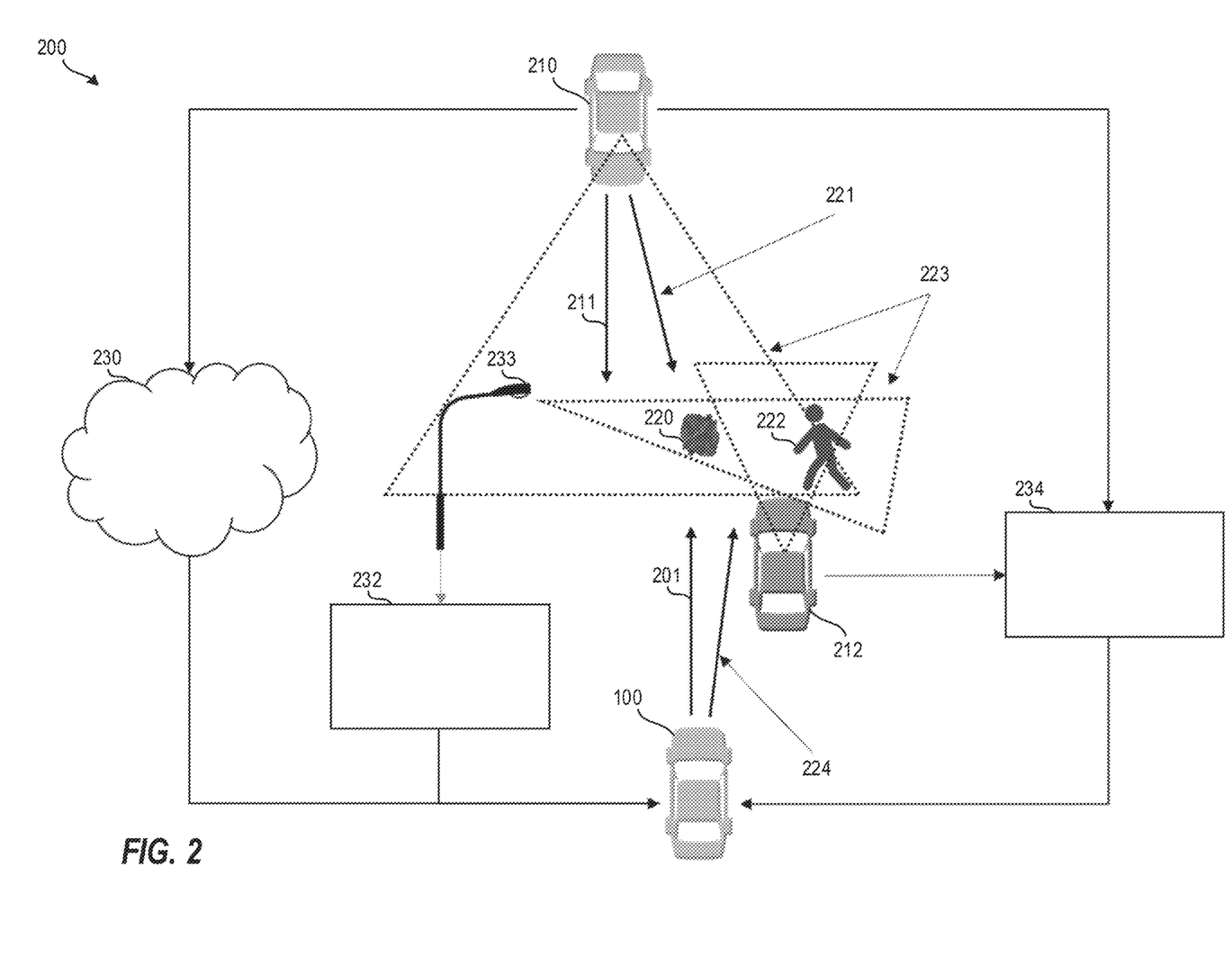
FIG. 2 depicts an environment that supports collaborative illumination according to one or more embodiments described herein.

In particular, FIG. 2 depicts an environment 200 that supports collaborative illumination according to one or more embodiments described herein. In this example, the environment 200 includes the vehicle 100, a vehicle 210, and a vehicle 212 configured and arranged as shown with the vehicles 100 and 210 being in motion along arrows 201, 211 respectively and the vehicle 212 being stationary (e.g., parked). The environment 200 also includes two objects: a road hazard 220 (e.g., a pothole) and a VRU 222 (e.g., a pedestrian). As can be seen, the road hazard 220 is in the path of the vehicle 100. Similarly, the pedestrian's intended path may cross the path of the vehicle 100. In either case, it is desirable to illuminate the road hazard 220 and the VRU 222. To do this, the present techniques identify the road hazard 220 and the VRU 222 and illuminate them using light assemblies of the vehicle 100, the vehicle 210, and/or the vehicle 212. For example, the processing system 110 of the vehicle 100 receives global data in the form of a cloud-based dynamic map 230 that shows the road hazard 220. The processing system 110 also receives local data (e.g., via V2I communications, V2V communications, edge communications, etc.) from two sources: data 232 generated by a camera associated with a light post 233 and data 234 generated by sensors associated with the vehicles 210, 212. The data 232, 234 can include local data, which can be in the form of a local awareness map that shows the position of the VRU 222. It should be appreciated that cameras, such as those associated with the vehicles 210, 212 and/or the light post 233 can have a field of view 223.

Using the data 230, 232, 234, the road hazard 220 and/or the VRU 222 can be illuminated, such as by the vehicle 100, the vehicle 210, the vehicle 212, and/or the light post 233. This makes the road hazard 220 and/or the VRU 222 easily observable to a driver of one of the vehicles 100, 210. For example, the vehicle 210 can make the pothole 220 salient 221. Similarly, the vehicle 201 can make the pedestrian salient 224.

As another example, the vehicle 212 can be illuminated by turning on its parking lights, for example, as the vehicle 100 and/or the vehicle 210 approach the vehicle 212. This makes the vehicle 212 more easily observable to a driver of one of the vehicles 100, 210.

Figure 3:
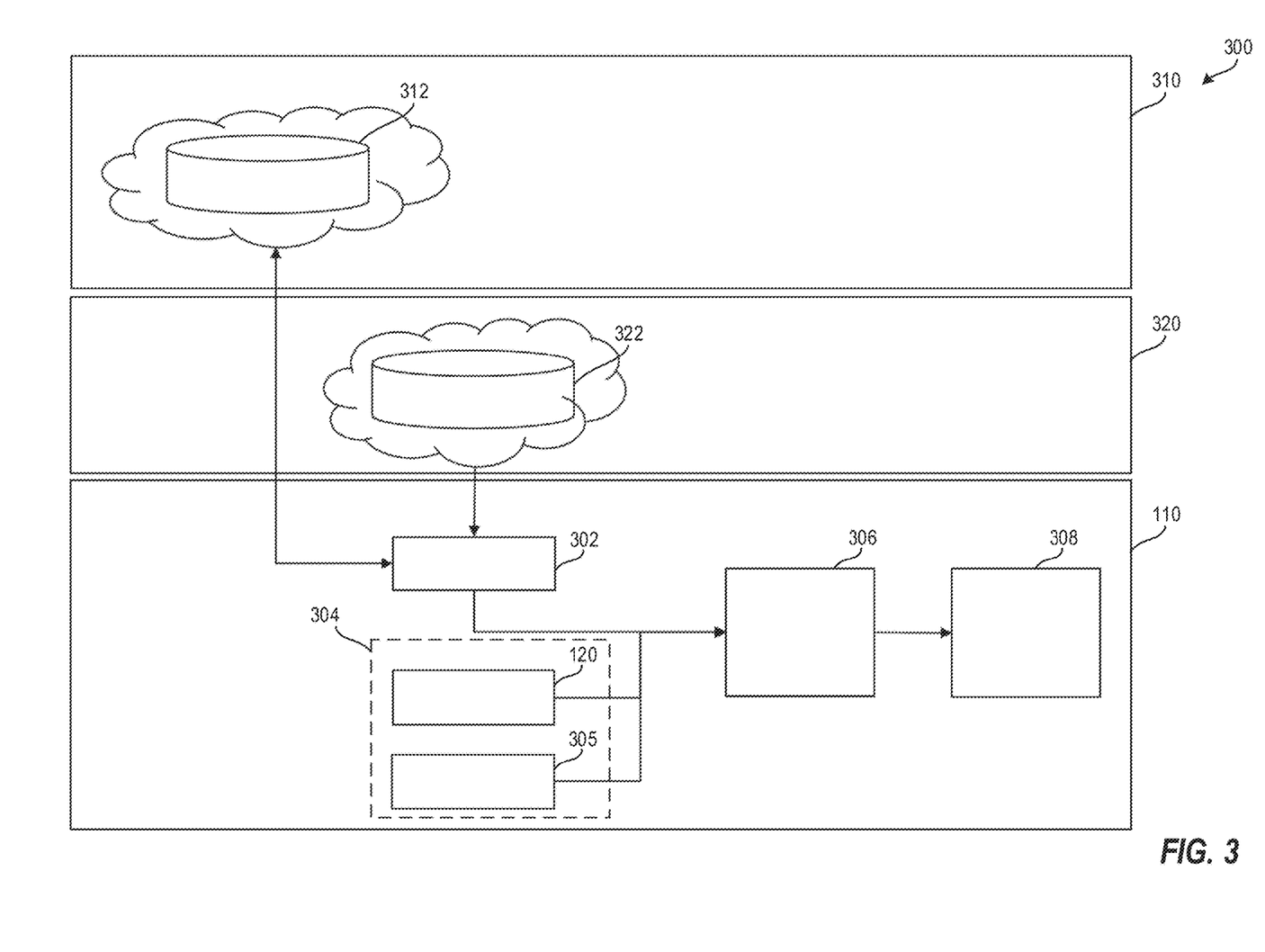
FIG. 3 depicts a system for collaborative illumination according to one or more embodiments described herein.

FIG. 3 depicts a system 300 for collaborative illumination according to one or more embodiments described herein. In this example, three computing/processing environments are depicted as follows: the processing system 110 of the vehicle 100, a cloud computing environment 310, and an edge computing environment 320. The processing system 110 can communicate with one or both of the environments 310, 320.

The cloud computing environment 310 can include one or more cloud computing nodes, such as cloud computing node 312. Cloud computing can supplement, support or replace some or all of the functionality of the elements of the processing system 110. In the example of FIG. 3, the cloud computing node 312 can be a datastore that stores global data. Global data is data that is not restricted to the immediate proximity of the vehicle 100. In examples, the global data can include road conditions, speed information, suspension data, etc. The cloud computing node 312 can be communicatively coupled to the processing system 110 of the vehicle, such as by cellular communications (e.g., 5G) directly and/or via the edge computing environment 320.

The edge computing environment 320 can include one or more edge computing nodes, such as edge computing node 322. The edge computing environment 320 provides computational and data storage resources closer to where it is needed (e.g., closer to the vehicle 100) relative to the cloud computing environment 310. In some examples, the cloud computing environment 310 can provide more data than the edge computing environment 320 but at a higher latency. In contrast, the edge computing environment 320 provides a lower latency but does not support as much data as the cloud computing environment 320. In this example, the edge computing node 322 can be a datastore that stores local data. Local data is data about an area in immediate proximity to the vehicle 100 (e.g., within 100 feet, within 200 yards, within 0.5 miles, etc.). The edge computing node 322 can be communicatively coupled to the processing system 110 of the vehicle, such as by cellular (e.g., 5G), V2I, V2V, V2P, and/or V2G communications.

The processing system 110 includes a telematics unit 302, sensor(s) 304, a data fusion unit 306, and a lamp control unit 308. The telematics unit 302 enables communications between the processing system 110 and the cloud computing node 312 and/or the edge computing node 322. The sensor(s) 304 can include one or more of the cameras 120-123, 130-133, a driver monitor sensor 305, the radar sensor 140, the LiDAR sensor 141, etc. The data fusion unit 306 takes information from the cloud computing node 312 (i.e., global data), information from the edge computing node 322 (i.e., local data), and information from the sensor(s) 304 and builds a map (object map) that indicates detected road hazards and/or VRUs. For example, the data fusion unit 306 takes a conventional map and adds indicia that indicate the presents of a detected road hazard and/or VRU. Location data is used to place the detected road hazard and/or VRU on the map appropriately. The lamp control unit 308 can illuminate detected road hazards and/or VRUs, such as by changing a brightness of a beam of a headlight, turning a headlight on/off, adjusting a direction of a beam of light emitted by a headlight, turning a parking light or other similar light on/off, and the like, including combinations thereof.

Figure 4:
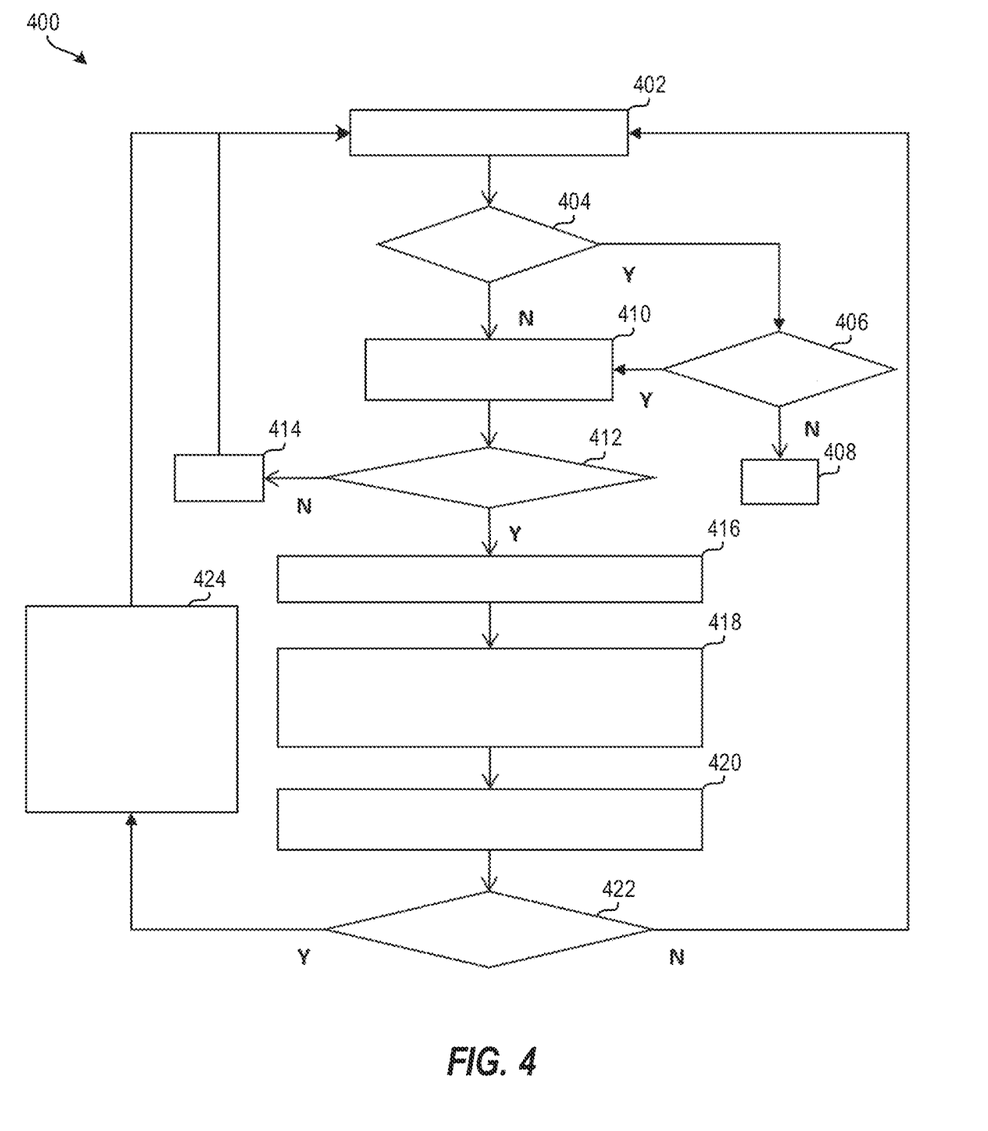
FIG. 4 depicts a flow diagram of a method for collaborative illumination according to one or more embodiments described herein.

FIG. 4 depicts a flow diagram of a method 400 for collaborative illumination according to one or more embodiments described herein.

At block 402, a perception cycle begins. The perception cycle can be approximately every 100 milliseconds, although other durations/periods are possible and within the scope of the present techniques.

At block 404, it is determined whether the target vehicle (e.g., the vehicle 100) is parked. This can be based on vehicle kinematic data, etc., received from the target vehicle. If it is determined that the target vehicle is parked, it is then determined at block 406 whether there is sufficient battery for illumination. This determination can be determined by comparing available battery level to a threshold such that if the threshold is satisfied, it is determined that sufficient battery for illumination exists. If insufficient battery is determined at block 406, the vehicle and/or its illumination system is turned off at block 408.

If sufficient battery is determined at block 406 or if it is determined that the target vehicle is not parked at block 404, an object map is then acquired at block 410. The object map indicates detected road hazards and/or VRUs. For example, a conventional map can be supplemented to create an object map by adding indicia that indicate the presents of a detected road hazard and/or VRU. Location data is used to place the detected road hazard and/or VRU on the map appropriately. The object map is received from the cloud computing environment 310 and/or the edge computing environment 320.

It is then determined at block 412 whether there is an object of interest (e.g., a road hazard and/or VRU) on the object map. This can include determining whether an object is along an intended path of the vehicle 100, in a field of view of an operator of the vehicle 100, etc. If there is not an object of interest detected at block 414, the perception cycle sleeps at block 414 for the remaining time of the perception cycle. If there is an object of interest detected at block 412, the method 400 proceeds to create a bounding box around a target at block 416, determine a centroid from the bounding box based on weight of the object and/or the driver gaze at block 418, and generate a light pattern to make the centroid area salient at block 420. The blocks 416, 418, 420 are described in more detail with reference to FIG. 5. Next, it is determined whether there is a collision risk at block 422. That is, it is determined whether the vehicle 100 is likely to collide with a VRU and/or road hazard. This can be determined by comparing kinematic data of the vehicle 100 to the location of the VRU and/or road hazard, for example. If the collision risk is not present (or does not satisfy a threshold) at block 422, the perception cycle can restart at block 402. However, the collision risk is present, the method 400 proceeds to provide an alert at block 424. This can include providing an external notification via a human-machine interface (HMI), which can include chirping a horn, turning on or brightening a light pattern, etc. The method 400 then returns to block 402, and the perception cycle restarts.

Figure 5:
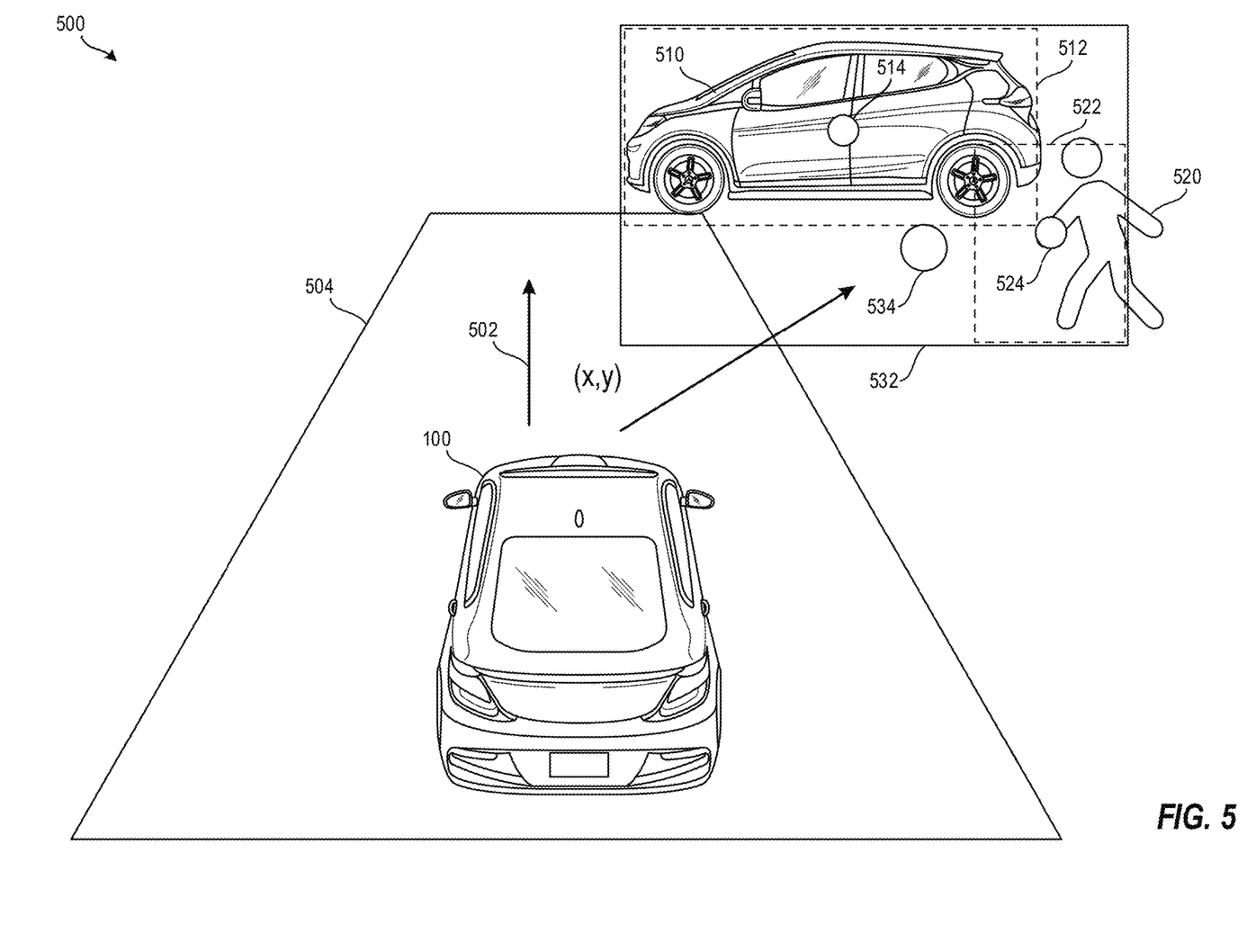
FIG. 5 depicts an illustration of a vehicle illuminating a road hazard and a VRU according to one or more embodiments described herein.

FIG. 5 depicts an illustration 500 of a vehicle 100 illuminating a road hazard 510 and a VRU 520 according to one or more embodiments described herein. Particularly, FIG. 5 relates to the blocks 416, 418, and 420 of FIG. 4, namely to create a bounding box around a target at block 416, determine a centroid from the bounding box based on weight of the object and/or the driver gaze at block 418, and generate a light pattern to make the centroid area salient at block 420.

In this example, the vehicle 100 is shown traveling along a path/trajectory 502. An object map 504 is also shown, bounded about an area surrounding and extending around the vehicle 100. In this example, two objects 510, 520 are detected. The road hazard 510 represents a road hazard in the form of another vehicle. The object 520 represents a VRU.

Bounding boxes 512, 522 are created around the objects 510, 520 respectively. According to one or more embodiments described herein, the bounding boxes 512, 522 are sized such that they are approximately the same size of the respective objects 510, 520. A center point (or "centroid") for each of the bounding boxes 512, 522 is generated. For example, the bounding box 512 has a center point 514, and the bounding box 522 has a center point 524. According to one or more embodiments described herein, the center points 514, 524 are unweighted such that they are in the center of the respective bounding boxes 512, 522.

A grouped bounding box 532 can be created based on the bounding boxes 512, 522. According to one or more embodiments described herein, the grouped bounding box 532 encompasses each of the bounding boxes 512, 522. A center point 534 (or "centroid") of the grouped bounding box 532 can be determined. According to one or more embodiments described herein, the center point 534 is not in the center of the bounding box 532; rather, it is biased based on the importance of the objects 510, 520. In this example, the center point 534 is biased towards the VRU (i.e., the object 520) as shown. According to one or more embodiments described herein, the weighting for the type of objects can be based on a type of the object (e.g., VRU vs. road hazard) and a risk associated with each object. For example, a pothole with a large magnitude may have a higher weight than a pothole with a small magnitude. Similarly, a VRU may have a higher weight than a non-VRU, such as shown in FIG. 5.

In this example, headlights (not shown) of the vehicle 100 can be configured to make a weighted mean center (e.g., the center point 534) of the grouped bounding box 532 more prominent. In some examples, the center point 534 can also be based on a projected gaze of a driver of the vehicle 100.

A coordinate-based location of the center point 534 can be determined for a target object illumination location X, Y based on an object location $x_i$, $y_i$, and an object threat level $w_i$ using the following equations, where X is the x-axis coordinate and Y is the y-axis coordinate of a cartesian coordinate system originated at the vehicle 100 or another suitable origin:

$$X = \frac{\sum_{i}^{n} w_i x_i}{\sum_{i}^{n} w_i} \quad Y = \frac{\sum_{i}^{n} w_i y_i}{\sum_{i}^{n} w_i}$$

Figure 6:
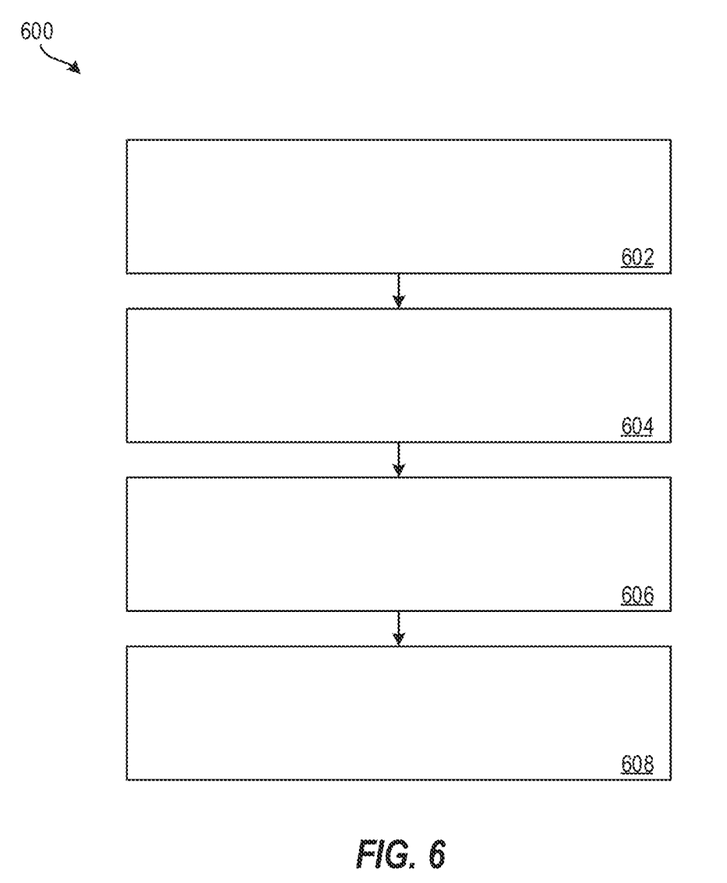
FIG. 6 depicts a flow diagram of a method for collaborative illumination according to one or more embodiments described herein.

FIG. 6 depicts a flow diagram of a method 600 for collaborative illumination according to one or more embodiments described herein. The method 600 can be performed by any suitable system or device such as the processing system 110 of FIG. 1, the processing system 700 of FIG. 7, or any other suitable processing system and/or processing device (e.g., a processor). The method 600 is now described with reference to the elements of FIG. 1 but is not so limited.

At block 602, the processing system 110 receives first road data. According to one or more embodiments described herein, the first road data is received from a cloud computing node of a cloud computing environment (see, e.g., the cloud computing environment 310 of FIG. 3). According to one or more embodiments described herein the first road data is received from an edge computing node (see, e.g., the edge computing environment 320 of FIG. 3). According to one or more embodiments described herein, the vehicle is a first vehicle, and the first road data is received from a second vehicle, such as from the remote processing system 150, which can be associated with the second vehicle. In such an example, the first road data can be received from the second vehicle via a direct vehicle-to-vehicle communication protocol between the first vehicle and the second vehicle as described herein. According to one or more embodiments described herein, the first road data includes local data and global data. Local data is data about an area in immediate proximity to the vehicle 100 (e.g., within 100 feet, within 200 yards, within 0.5 miles, etc.). Local data may be provided, for example, by an edge computing environment for example. Global data is data that is not restricted to the immediate proximity of the vehicle 100. In examples, the global data can include road conditions, speed information, suspension data, etc.

At block 604, the processing system 110 receives second road data from a sensor associated with the vehicle. The sensor can be one or more of one of the cameras 120-123, 130-133, the radar sensor 140, the LiDAR sensor 141, and/or any other suitable sensor.

At block 606, the processing system 110 identifies at least one of a vulnerable road user or a road hazard based at least in part on the first road data and the second road data. According to one or more embodiments described herein, identifying the at least one of the vulnerable road user or the road hazard includes fusing, by the processing device of the vehicle (such as using the data fusion unit 306), the first road data and the second road data. According to one or more embodiments described herein, identifying the at least one of the vulnerable road user or the road hazard is further based at least in part on a gaze of an operator of the vehicle.

According to one or more embodiments described herein (see, e.g., FIG. 5), identifying the at least one of the vulnerable road user or the road hazard includes generating an object map, generating (on the object map) a bounding box around the at least one of the vulnerable road user or the road hazard, and determining a centroid of the bounding box. In such an example, the at least one of the vulnerable road user or the road hazard is a first at least one of the vulnerable road user or the road hazard, the bounding box is a first bounding box, and the centroid is a first centroid. In such examples, the method further includes identifying a second at least one of a vulnerable road user or a road hazard; generating, on the object map, a second bounding box around the second at least one of the vulnerable road user or the road hazard; determining a second centroid of the second bounding box; generating, on the object map, a group bounding box around the first at least one of the vulnerable road user or the road hazard and the second at least one of the vulnerable road user or the road hazard; and determining a group centroid of the group bounding box. In examples, the group centroid is biased based at least in part on a type of the first at least one of the vulnerable road user or the road hazard and a type of the second at least one of the vulnerable road user or the road hazard.

At block 608, the processing system 110 causes the at least one of the vulnerable road user or the road hazard to be illuminated. For example, causing the at least one of the vulnerable road user or the road hazard to be illuminated includes illuminating the at least one of the vulnerable road user or the road hazard using a light assembly of the vehicle. As another example, the illuminating includes increasing (and/or decreasing) a brightness of a light emitted by the light assembly (e.g., a headlight, a parking light, etc.) of the vehicle 100. According to one or more embodiments described herein, causing the at least one of the vulnerable road user or the road hazard to be illuminated includes illuminating the at least one of the vulnerable road user or the road hazard using a light assembly of another vehicle (e.g., the vehicle 210, the vehicle 212. In examples, the other vehicle can be a parked or operating vehicle.

Additional processes also may be included, and it should be understood that the process depicted in FIG. 6 represents an illustration and that other processes may be added or existing processes may be removed, modified, or rearranged without departing from the scope and spirit of the present disclosure.

Figure 7:
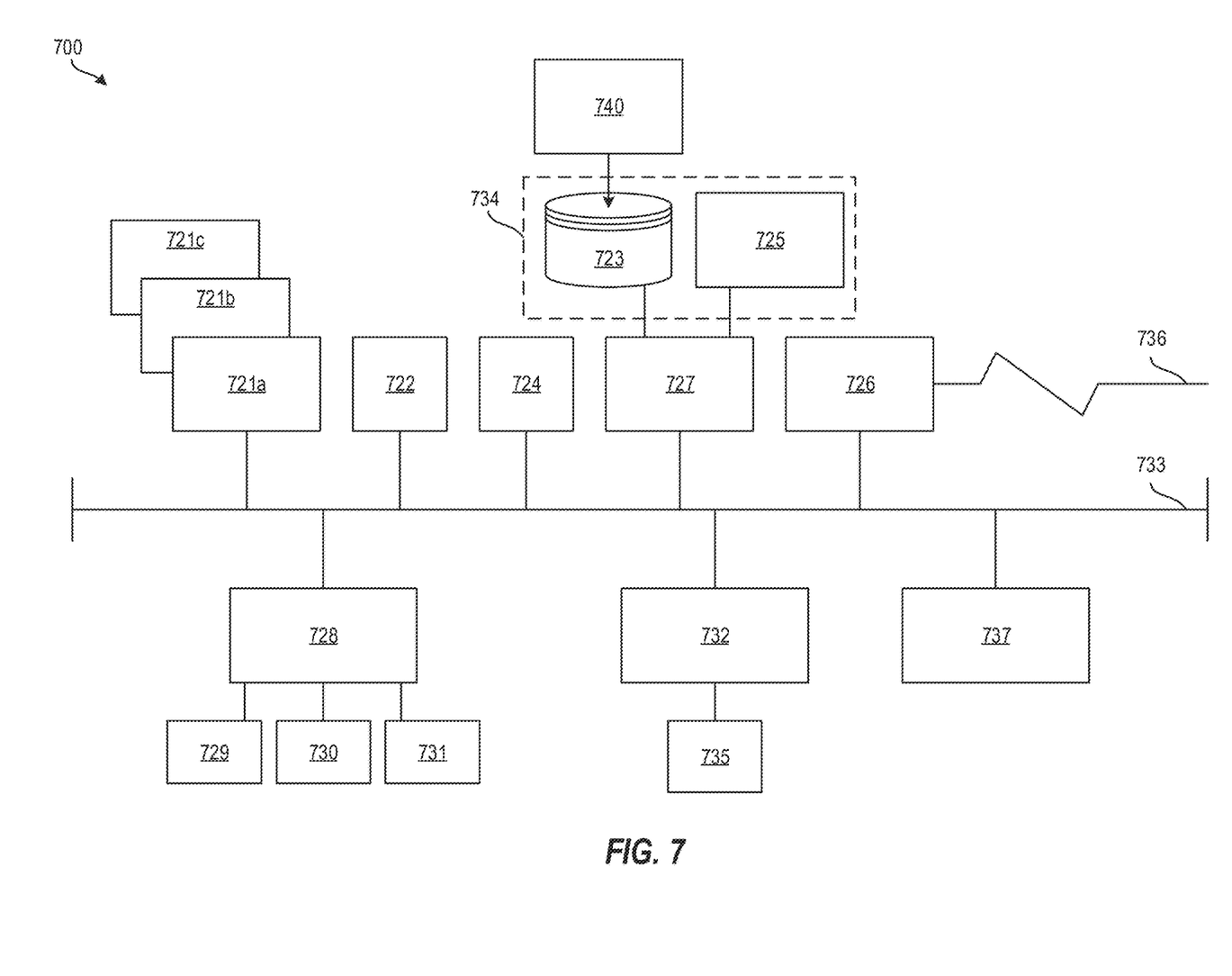
FIG. 7 depicts a block diagram of a processing system for implementing the techniques described herein according to an exemplary embodiment.

It is understood that the present disclosure is capable of being implemented in conjunction with any type of computing environment now known or later developed. For example, FIG. 7 depicts a block diagram of a processing system 700 for implementing the techniques described herein. In examples, processing system 700 has one or more central processing units (processors) 721a, 721b, 721c, etc. (collectively or generically referred to as processor(s) 721 and/or as processing device(s)). In aspects of the present disclosure, each processor 721 can include a reduced instruction set computer (RISC) microprocessor. Processors 721 are coupled to system memory (e.g., random access memory (RAM) 724) and various other components via a system bus 733. Read only memory (ROM) 722 is coupled to system bus 733 and may include a basic input/output system (BIOS), which controls certain basic functions of processing system 700.

Further depicted are an input/output (I/O) adapter 727 and a network adapter 726 coupled to system bus 733. I/O adapter 727 may be a small computer system interface (SCSI) adapter that communicates with a hard disk 723 and/or a storage device 725 or any other similar component. I/O adapter 727, hard disk 723, and storage device 725 are collectively referred to herein as mass storage 734. Operating system 740 for execution on processing system 700 may be stored in mass storage 734. The network adapter 726 interconnects system bus 733 with an outside network 736 enabling processing system 700 to communicate with other such systems.

A display (e.g., a display monitor) 735 is connected to system bus 733 by display adapter 732, which may include a graphics adapter to improve the performance of graphics intensive applications and a video controller. In one aspect of the present disclosure, adapters 726, 727, and/or 732 may be connected to one or more I/O busses that are connected to system bus 733 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 733 via user interface adapter 728 and display adapter 732. A keyboard 729, mouse 730, and speaker 731 (or other suitable input and/or output, such as a touch screen of an infotainment system) may be interconnected to system bus 733 via user interface adapter 728, which may include, for example, a Super I/O chip integrating multiple device adapters into a single integrated circuit. One or more of the cameras 120-123, 130-133 are also connected to the system bus 733.

In some aspects of the present disclosure, processing system 700 includes a graphics processing unit 737. Graphics processing unit 737 is a specialized electronic circuit designed to manipulate and alter memory to accelerate the creation of images in a frame buffer intended for output to a display. In general, graphics processing unit 737 is very efficient at manipulating computer graphics and image processing, and has a highly parallel structure that makes it more effective than general-purpose CPUs for algorithms where processing of large blocks of data is done in parallel.

Thus, as configured herein, processing system 700 includes processing capability in the form of processors 721, storage capability including system memory (e.g., RAM 724), and mass storage 734, input means such as keyboard 729 and mouse 730, and output capability including speaker 731 and display 735. In some aspects of the present disclosure, a portion of system memory (e.g., RAM 724) and mass storage 734 collectively store the operating system 740 to coordinate the functions of the various components shown in processing system 700.

The descriptions of the various examples of the present disclosure have been presented for purposes of illustration but are not intended to be exhaustive or limited to the embodiments disclosed. Many modifications and variations will be apparent to those of ordinary skill in the art without departing from the scope and spirit of the described techniques. The terminology used herein was chosen to best explain the principles of the present techniques, the practical application or technical improvement over technologies found in the marketplace, or to enable others of ordinary skill in the art to understand the techniques disclosed herein.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present techniques not be limited to the particular embodiments disclosed, but will include all embodiments falling within the scope of the application.

What is claimed is:

1. A computer-implemented method for collaborative illumination, the method comprising:
receiving, by a processing device of a vehicle, first road data;
receiving, by the processing device of the vehicle, second road data from a sensor associated with the vehicle;
identifying, by the processing device of the vehicle, at least one of a vulnerable road user or a road hazard based at least in part on the first road data and the second road data by generating an object map, generating, on the object map, a bounding box around the at least one of the vulnerable road user or the road hazard, and determining a centroid of the bounding box; and
subsequent to determining the centroid of the bounding box, causing, by the processing device of the vehicle, the at least one of the vulnerable road user or the road hazard to be illuminated by causing an illumination source exterior to the vehicle to generate a light pattern configured to make the centroid salient.

2. The computer-implemented method of claim 1, wherein the first road data is received from a cloud computing node of a cloud computing environment.

3. The computer-implemented method of claim 1, wherein the first road data is received from an edge computing node.

4. The computer-implemented method of claim 1, wherein the vehicle is a first vehicle, and wherein the first road data is received from a second vehicle.

5. The computer-implemented method of claim 4, wherein the first road data is received from the second vehicle via a direct vehicle-to-vehicle communication protocol between the first vehicle and the second vehicle.

6. The computer-implemented method of claim 1, wherein the first road data comprises local data and global data.

7. The computer-implemented method of claim 1, wherein the sensor is selected from the group consisting of a camera, a LiDAR device, and a radar device.

8. The computer-implemented method of claim 1, wherein identifying the at least one of the vulnerable road user or the road hazard comprises fusing, by the processing device of the vehicle, the first road data and the second road data.

9. The computer-implemented method of claim 1, wherein causing the at least one of the vulnerable road user or the road hazard to be illuminated comprises:
   illuminating the at least one of the vulnerable road user or the road hazard using a light assembly of the vehicle.

10. The computer-implemented method of claim 9, wherein the illuminating comprises increasing a brightness of a light emitted by the light assembly of the vehicle.

11. The computer-implemented method of claim 1, wherein the illuminating comprises decreasing a brightness of a light emitted by a light assembly of the vehicle.

12. The computer-implemented method of claim 1, wherein causing the at least one of the vulnerable road user or the road hazard to be illuminated comprises:
   illuminating the at least one of the vulnerable road user or the road hazard using a light assembly of another vehicle.

13. The computer-implemented method of claim 1, wherein the vehicle is a first vehicle, and wherein causing the at least one of the vulnerable road user or the road hazard to be illuminated comprises:
   illuminating the at least one of the vulnerable road user or the road hazard using a light assembly of a second vehicle.

14. The computer-implemented method of claim 13, wherein the second vehicle is a parked vehicle.

15. The computer-implemented method of claim 1, wherein identifying the at least one of the vulnerable road user or the road hazard is further based at least in part on a gaze of an operator of the vehicle.

16. The computer-implemented method of claim 1, wherein the at least one of the vulnerable road user or the road hazard is a first at least one of the vulnerable road user or the road hazard, wherein the bounding box is a first bounding box, and wherein the centroid is a first centroid, the method further comprising:
   identifying a second at least one of a vulnerable road user or a road hazard;
   generating, on the object map, a second bounding box around the second at least one of the vulnerable road user or the road hazard;
   determining a second centroid of the second bounding box;
   generating, on the object map, a group bounding box around the first at least one of the vulnerable road user or the road hazard and the second at least one of the vulnerable road user or the road hazard; and
   determining a group centroid of the group bounding box.

17. The computer-implemented method of claim 16, wherein the group centroid is biased based at least in part on a type of the first at least one of the vulnerable road user or the road hazard and a type of the second at least one of the vulnerable road user or the road hazard.

18. A system comprising:
   a memory comprising computer readable instructions; and
   a processing device for executing the computer readable instructions, the computer readable instructions controlling the processing device to perform operations for collaborative illumination, the operations comprising:
   receiving, by the processing device of a vehicle, first road data;
   receiving, by the processing device of the vehicle, second road data from a sensor associated with the vehicle;
   identifying, by the processing device of the vehicle, at least one of a vulnerable road user or a road hazard based at least in part on the first road data and the second road data by generating an object map, generating, on the object map, a bounding box around the at least one of the vulnerable road user or the road hazard, and determining a centroid of the bounding box; and
   subsequent to determining the centroid of the bounding box, causing, by the processing device of the vehicle, the at least one of the vulnerable road user or the road hazard to be illuminated by causing an illumination source exterior to the vehicle to generate a light pattern configured to make the centroid salient.

19. A non-transitory computer readable storage medium comprising a computer program product having program instructions embodied therewith, the program instructions executable by a processing device to cause the processor to perform operations for collaborative illumination, the operations comprising:
   receiving, by the processing device of a vehicle, first road data;
   receiving, by the processing device of the vehicle, second road data from a sensor associated with the vehicle;
   identifying, by the processing device of the vehicle, at least one of a vulnerable road user or a road hazard based at least in part on the first road data and the second road data by generating an object map, generating, on the object map, a bounding box around the at least one of the vulnerable road user or the road hazard, and determining a centroid of the bounding box; and
   subsequent to determining the centroid of the bounding box, causing, by the processing device of the vehicle, the at least one of the vulnerable road user or the road hazard to be illuminated by causing an illumination source exterior to the vehicle to generate a light pattern configured to make the centroid salient.

20. The computer-implemented method of claim 1, further comprising:
   identifying a collision risk between the vehicle and the at least one of the vulnerable road user or the road hazard; and
   providing an alert by at least one of providing an external notification via a human-machine interface (HMI), the external notification including at least one of chirping a horn, turning on a light pattern, or brightening a light pattern.

* * * * *